United States Patent Office 3,635,973
Patented Jan. 18, 1972

---

3,635,973
METHOD OF PREPARING 3-SUBSTITUTED PYRIDOPYRIMIDINEDIONES AND LUMAZINES
Richard L. Jacobs, Perrysburg, Ohio, assignor to The Sherwin-Williams Company, Cleveland, Ohio
No Drawing. Continuation-in-part of application Ser. No. 740,090, June 26, 1968. This application Nov. 20, 1969, Ser. No. 878,593
Int. Cl. C07d 57/28
U.S. Cl. 260—251.5         9 Claims

ABSTRACT OF THE DISCLOSURE

A method of preparing 3-substituted-pyrido[2,3-d]pyrimidine-2,4(1H,3H)-diones, 3-substituted-pyrido[3,2-d]pyrimidine - 2,4(1H,3H) - diones, 3 - substituted-pyrido[3,4-d]pyrimidine - 2,4(1H,3H) - diones, 3 - substituted pyrido[4,3-d]pyrimidine-2,4(1H,3H)-diones, and 3-substituted lumazines from the corresponding N-monosubstituted 2,3- and 3,4-pyridinedicarboxamides, and 2,3-pyrazinedicarboxamides, in which the aforesaid compounds are reacted with an alkali or alkaline earth metal hypohalite in the presence of a base, preferably aqueous sodium hydroxide. Many of the pyridopyrimidinediones and lumazines thus formed are useful as agricultural chemicals, in particular as herbicides, and the others are peculiarly useful, because of their close chemical similarity but drastically different herbicidal activity, in investigatory research as to the relationship between chemical structure and herbicidal structure.

---

REFERENCE TO RELATED APPLICATION

This is a continuation-in-part of application Ser. No. 740,090, filed June 26, 1968, now abandoned.

BACKGROUND OF THE INVENTION

This invention relates to a method for producing compounds which have been found to have utility as selective weed killers, defoliating agents, and as agricultural chemicals.

In recent years increased crop yields have been made possible by the development and use of chemicals which are specifically toxic to weeds, yet do not damage crops around which they are applied. In general, the currently available chemicals which are most desired for their selectivity and as total herbicides are sufficiently expensive that expense is a significant factor in their use. Therefore, new compounds and inexpensive methods for producing such compounds are constantly being sought.

In addition, while many compounds presently on the market are effective against certain species of weeds, they are ineffective against others. Thus new herbicides which have broad spectrum effectiveness against a wide variety of weeds are continually being sought.

It is an object of the invention to provide an easy one step method for the production of the following compounds wherein R has the meaning subsequently indicated:

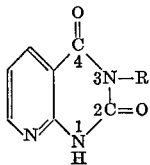

3 - substituted - pyrido[2,3-d]pyrimidine - 2,4(1H,3H)-diones

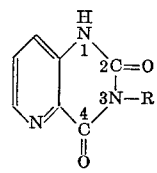

3 - substituted - pyrido[3,2-d]pyrimidine - 2,4(1H,3H)-diones

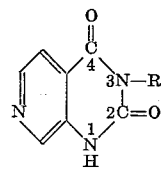

3 - substituted - pyrido[3,4-d]pyrimidine - 2,4(1H,3H)-diones

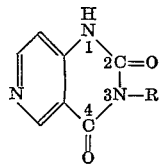

3 - substituted - pyrido[4,3-d]pyrimidine - 2,4(1H,3H)-diones, and

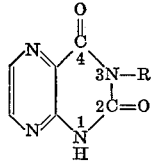

3-substituted lumazines.

Other objects and advantages of this invention will be apparent from the description to follow.

SUMMARY OF THE INVENTION

The process of this invention comprises reacting (1) a compound selected from those having the general formulae

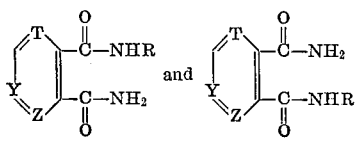

and mixtures thereof wherein each of T, Y and Z is nitrogen or CH, at least one is nitrogen and at least one is CH, and wherein when Y is nitrogen, T and Z are CH, and wherein R is a member of hte group consisting of alkyl groups having from 1 to 8 carbon atoms, aralkyl groups such as benzyl, cycloalkyl groups having from 3 to 12 carbon atoms, alkenyl groups having not more than 8 carbon atoms, and alkynyl groups having not more than 8 carbon atoms, with (2) a metal hypohalite of the formula MOX wherein M is an alkali or alkaline earth metal and wherein X is chlorine or bromine, said reaction being carried out in the presence of an alkali or alkaline earth metal hydroxide and a suitable solvent, preferably at elevated temperatures.

The reaction is illustrated generally below, T, Y, Z, and R having the meanings assigned above.

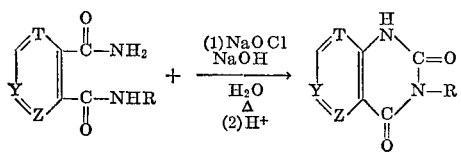

The reaction is self-generating and will proceed in the absence of heat, but the reaction will go faster if the reaction mixture is heated. For that reason it is preferable to heat the reaction mixture to a temperature from about 50°[1] to the boiling temperature thereof, most desirably about 60–80°, and hold it at such temperature for about ½ hour. Thereafter the mixture is cooled to room temperature and neutralized with acid at which time the reaction product precipitates.

This invention can be more clearly understood by reference to the following examples.

EXAMPLE I

Preparation of 3-sec-butyl-pyrido[3,2-d] pyrimidine-2,4(1H,3H)-dione

A 22-l. flask equipped with a stirrer and a thermometer, and surrounded by a heating mantle was charged with 6 l. water, 369 g. sodium hydroxide and 11.65 l. aqueous solution containing 745 g. NaOCl. Stirring was commenced, and was continued throughout the reaction. When this charging was complete, the temperature of the charge was 34°; then 2.2 kg. $N^2$-sec-butyl-2,3-pyridine-dicarboxamide was added to the NaOCl-NaOH solution in the flask. After the pyridine dicarboxamide dissolved, the temperature of the reaction mixture was 33°; the reaction mixture was then heated for a total of about 50 minutes. The temperature after 20 minutes of heating was 60°, after 50 minutes of heating 67°. The heating mantle was then removed, and the flask was immersed in an ice bath for about 1 hour 45 minutes; the final temperature of the reaction product was 17°. Approximately a 75 liter receiving vessel was then charged with 600 ml. glacial acetic acid, and immersed in an ice bath. The reaction product was then added gradually to the acetic acid in the receiver, with stirring. The rate of addition of the reaction product was controlled so that the temperature of the liquid in the receiver remained within the range of 10 to 15°. The pH of the liquid in the receiver was monitored, and additions of glacial acetic acid were made, as required, to prevent the pH thereof from rising above about 6. The 3-sec-butyl-pyrido[3,2-d]pyrimidine-2,4 (1H,3H)-dione product, which had separated as an off white to cream precipitate, was separated from the mother liquor by filtration, using a Büchner funnel. The final product was washed with tap water and dried in a circulating air over in which the air was maintained at a temperature within the range of 80 to 100°. The total recovery of dried product amounted to 2.45 kg., or 95 percent of theory. It was determined by nuclear magnetic resonance analysis that the product was 98 percent, plus or minus 2 percent, 3-sec-butyl-pyrido[3,2-d]pyrimidine-2,4(1H,3H)-dione. The remainder of the product, if any, was 3 - sec - butylpyrido[2,3-d]pyrimidine-2,4(1H,3H)-dione. The presence of the [2,3-d]-family compound, if any, is attributable to an impurity in the amide starting material.

EXAMPLE II

Preparation of 3-isopropyl-pyrido[3,2-d]pyrimidine 2,4(1H,3H)-dione

A 22 l. flask equipped with a stirrer and a thermometer, and surrounded by a heating mantle was charged with 8 l. water, 398 g. sodium hydroxide and 9.5 l. aqueous solution containing 595 g. NaOCl. Stirring was commenced, and was continued throughout the reaction. When this charging was complete, the temperature of the charge was 31°; then, 1.76 kg. $N^2$-isopropyl-2,3-pyridinedicarboxamide was added to the NaOCl-NaOH solution in the flask. After the pyridinedicarboxamide dissolved, the temperature of the reaction mixture was 33°; the reaction mixture was then heated for a total of about 55 minutes. The temperature after 10 minutes of heating was 40°, after 15 minutes 44°, after 21 minutes 52°, after 25 minutes, 60°, and, after 55 minutes 63°. The heating mantle was then removed, and the flask was immersed in an ice bath for about 2 hours 50 minutes; the final temperature of the reaction product was 10°. The reaction mixture was then acidified by making a gradual addition of glacial acetic acid to a pH of 6. The rate of addition of acetic acid was controlled so that the temperature of the reaction mixture in the flask remained within the range of 10 to 15°. The 3-isopropyl - pyrido[3,2-d]pyrimidine - 2,4(1H, 3H)-dione product, which had separated as an off-white to cream precipitate, was separated from the mother liquor by filtration, using a Buchner funnel. The final product was washed with tap water and dried in a circulating air oven in which the air was maintained at a temperature within the range of 80 to 100°.

The total recovery of dry product, melting point 238–244°, amounted to 1.48 kg., or 89.8 percent of theory. It was determined by nuclear magnetic resonance analysis that the product was 87 percent, plus or minus 10 percent, 3-isopropyl - pyrido[3,2-d]pyrimidine-2,4(1H,3H)-dione. The remainder of the product was 3-isopropyl-pyrido [2,3-d]pyrimidine-2,4(1H,3H)-dione. The presence of the [²,3-d]-family compound is attributable to an impurity in the amide starting material.

It will be noted that, in the procedure described in Example I, the reaction product was added to glacial acetic acid while, in the procedure described in Example II, glacial acetic acid was added to the reaction product. It has been found that, in some instances, the Example II procedure causes the dione product to appear as a sticky solid; this causes difficulty in "work-up." Such difficulty is minimized, or eliminated altogether when the Example I technique is used; this procedure is, therefore, preferred.

EXAMPLES III THROUGH XXXII

Numerous other compounds have been produced by the method of the invention. Information concerning starting materials, batch sizes, final product and yield for representative ones of such preparations is presented in Table I, following:

---

[1] All temperatures reported herein and in the attached claims are in degrees centigrade unless otherwise specified.

TABLE I

| Example | Starting amide Name | Metal hypohalite Grams | Metal hypohalite Name or formula | Ml. solution | Base Name or formula | Base Grams | Added water, ml. | Final product Name | Yield (grams) |
|---|---|---|---|---|---|---|---|---|---|
| III | N2-cyclohexyl-2,3-pyridine dicarboxamide | 1,985 | NaOCl | 9,500 | NaOH | 396 | 8,000 | 3-cyclohexyl-pyrido[3,2-d]pyrimidine-2,4(1H,3H)-dione | 1,925 |
| IV | N2-ethyl-2,3-pyridine dicarboxamide | 10 | NaOCl | 50.2 | NaOH | 2.06 | 25 | 3-ethyl-pyrido[3,2-d]pyrimidine-2,4(1H,3H)-dione | 6.3 |
| V | N2-propyl-2,3-pyridine dicarboxamide | 41.4 | NaOCl | 192 | NaOH | 8.3 | 300 | 3-n-propyl-pyrido[3,2-d]pyrimidine-2,4(1H,3H)-dione | 25 |
| VI | N2-allyl-2,3-pyridine dicarboxamide | 30.8 | NaOCl | 146 | NaOH | 6.1 | 280 | 3-allyl-pyrido[3,2-d]pyrimidine-2,4(1H,3H)-dione | 10 |
| VII | N2-propargyl-2,3-pyridine dicarboxamide | 20.5 | NaOCl | 97 | NaOH | 4.1 | 150 | 3-propargyl-pyrido[3,2-d]pyrimidine-2,4(1H,3H)-dione | 0.5 |
| VIII | N2-cyclopropyl-2,3-pyridine dicarboxamide | 14 | NaOCl | 68 | NaOH | .3 | 120 | 3-cyclopropyl-pyrido[3,2-d]pyrimidine-2,4(1H,3H)-dione | 2.9 |
| IX | N2-butyl-2,3-pyridine dicarboxamide | 22.1 | NaOCl | 92.3 | NaOH | 4.1 | 350 | 3-n-butyl-pyrido[3,2-d]pyrimidine-2,4(1H,3H)-dione | 16.3 |
| X | N2-(2-ethylhexyl)-2,3-pyridine dicarboxamide | 41.6 | NaOCl | 145 | NaOH | 6.1 | 230 | 3-(2-ethylhexyl)-pyrido[3,2-d]pyrimidine-2,4(1H,3H)-dione | 36.7 |
| XI | N2-cyclooctyl-2,3-pyridine dicarboxamide | 11.2 | NaOCl | 34.8 | NaOH | 1.49 | 80 | 3-cyclooctyl-pyrido[3,2-d]pyrimidine-2,4(1H,3H)-dione | 4.4 |
| XII | N2-benzyl-2,3-pyridine dicarboxamide | 51.1 | NaOCl | 194 | NaOH | 8.3 | 300 | 3-benzyl-pyrido[3,2-d]pyrimidine-2,4(1H,3H)-dione | 22.6 |
| XIII | N2-sec-butyl-2,3-pyridine dicarboxamide | 2.7 | NaOCl | 20 | NaOH | 0.8 | 45 | 3-sec-butyl-pyrido[3,2-d]pyrimidine-2,4(1H,3H)-dione | 2.8 |
| XIV | N4-isopropyl-2,6-pyridine dicarboxamide | 4.43 | NaOCl | 208 | KOH | | | 3-isopropyl-pyrido[3,4-d]pyrimidine-2,4(1H,3H)-dione | 1.3 |
| XV | N4-isopropyl-2,3-pyridine dicarboxamide | 4.1 | KOBr | 125 | KOH | | | 3-isopropyl-pyrido[2,3-d]pyrimidine-2,4(1H,3H)-dione | 4.0 |
| XVI | N3-isopropyl-3,4-pyridine dicarboxamide | 5.2 | KOBr | 200 | KOH | | | 3-isopropyl-pyrido[4,3-d]pyrimidine-2,4(1H,3H)-dione | 4.0 |
| XVII | N-cyclohexyl-2,3-pyrazine dicarboxamide | 8.1 | NaOCl | 70 | NaOH | 3.1 | 240 | Lumazine, 3-cyclohexyl | 19.3 |
| XVIII | N-sec-butyl-2,3-pyrazine dicarboxamide | 18.1 | NaOCl | 58 | NaOH | 2.6 | 220 | Lumazine, 3-sec.-butyl | 8.4 |
| XIX | N-cyclooctyl-2,3-pyrazine dicarboxamide | 12 | NaOCl | 83 | NaOH | 7.1 | 400 | Lumazine, 3-cyclohexyl | 22.1 |
| XX | N-isopropyl-2,3-pyrazine dicarboxamide | 24 | NaOCl | 111.6 | NaOH | 4.9 | 400 | Lumazine, 3-isopropyl | 20.7 |
| XXI | N-butyl-2,3-pyrazine dicarboxamide | 25 | NaOCl | 59 | NaOH | 2.6 | 220 | Lumazine, 3-n-butyl | 9.7 |
| XXII | N2-α-phenethyl-2,3-pyridine dicarboxamide | 12 | NaOCl | 240 | NaOH | 8 | 500 | 3-α-phenethyl-pyrido[3,2-d]pyrimidine-2,4(1H,3H)-dione | 77.0 |
| XXIII | N2-(2,2-dimethoxyethyl)-2,3-pyridine dicarboxamide | 25.3 | NaOCl | 250 | NaOH | 16 | 700 | 3-(2,2-dimethoxyethyl)-pyrido[3,2-d]pyrimidine-2,4(1H,3H)-dione | 48.0 |
| XXIV | N2-(2-chlorobenzyl)-2,3-pyridine dicarboxamide | 44.3 | NaOCl | 197 | NaOH | 8 | 500 | 3-(2-chlorobenzyl)-pyrido[3,2-d]pyrimidine-2,4(1H,3H)-dione | 38.8 |
| XXV | N2-(3-chlorobenzyl)-2,3-pyridine dicarboxamide | 29 | NaOCl | 300 | NaOH | 16 | 1,200 | 3-(3-chlorobenzyl)-pyrido[3,2-d]pyrimidine-2,4(1H,3H)-dione | 29 |
| XXVI | N2-(4-chlorobenzyl)-2,3-pyridine dicarboxamide | 56.2 | NaOCl | 110 | NaOH | 9 | 600 | 3-(4-chlorobenzyl)-pyrido[3,2-d]pyrimidine-2,4(1H,3H)-dione | 21.7 |
| XXVII | N2-(3,4-dichlorobenzyl)-2,3-pyridine dicarboxamide | 33 | NaOCl | 198 | NaOH | 10 | 800 | 3-(3,4-dichlorobenzyl)-pyrido[3,2-d]pyrimidine-2,4(1H,3H)-dione | 24 |
| XXVIII | N2-(2,4-dichlorobenzyl)-2,3-pyridine dicarboxamide | 39.7 | NaOCl | 250 | NaOH | 8 | 800 | 3-(2,4-dichlorobenzyl)-pyrido[3,2-d]pyrimidine-2,4(1H,3H)-dione | 48.8 |
| XXIX | N2-(4-methoxybenzyl)-2,3-pyridine dicarboxamide | 36.8 | NaOCl | 90 | NaOH | 8 | 500 | 3-(4-methoxybenzyl)-pyrido[3,2-d]pyrimidine-2,4(1H,3H)-dione | 44.5 |
| XXX | N2-(2-pyridyl)-2,3-pyridine dicarboxamide | 23.8 | NaOCl | 290 | NaOH | 12 | 800 | 3-(2-pyridyl)-pyrido[3,2-d]pyrimidine-2,4(1H,3H)-dione | 64.2 |
| XXXI | N2-(3-pyridylethyl)-2,3-pyridine dicarboxamide | 42 | NaOCl | 210 | NaOH | 16 | 1,000 | 3-(3-pyridylethyl)-pyrido[3,2-d]pyrimidine-2,4(1H,3H)-dione | 41.0 |
| XXXII | N2-(3-pyridylmethyl)-2,3-pyridine dicarboxamide | 51.3 | NaOCl | 210 | NaOH | 16 | 1,000 | 3-(3-pyridylmethyl)-pyrido[3,2-d]pyrimidine-2,4(1H,3H)-dione | 41.0 |
| XXXIII | N2-tetrahydrofurfuryl-2,3-pyridine dicarboxamide | 35.4 | NaOCl | 250 | NaOH | 10 | 600 | 3-tetrahydrofurfuryl-pyrido[3,2-d]pyrimidine-2,4(1H,3H)-dione | 68.5 |

Time-temperature readings for each of the reactions represented by the examples set forth in Table I are presented in Table II below. Zero time is when the amide is added to the reaction mixture.

TABLE II

| Example | Time, minutes-seconds | Temperature, degrees |
|---|---|---|
| III | 0:00 | 23 |
| | 20:00 | 36 |
| | 32:00 | 48 |
| | 37:00 | 55 |
| | 40:00 | 60 |
| | 43:00 | 64 |
| | 55:00 | 63 |
| | 70:00 | 60 |
| IV | 0:00 | 11 |
| | 0:45 | 15 |
| | 1:30 | 18 |
| | 2:30 | 39 |
| | 4:00 | 60 |
| | 5:30 | 78 |
| | 7:00 | 79 |
| | 12:00 | 76 |
| | 36:00 | 62 |
| | 47:00 | 16 |
| V | 0:00 | 17 |
| | 2:00 | 24 |
| | 4:00 | 42 |
| | 5:00 | 55 |
| | 8:00 | 69 |
| | 10:00 | 68 |
| | 12:00 | 65 |
| | 25:00 | 52 |
| VI | 0:00 | 15 |
| | 1:00 | 22 |
| | 3:00 | 50 |
| | 4:00 | 70 |
| | 5:00 | 80 |
| | 19:00 | 86 |
| | 35:00 | 86 |
| VII | 0:00 | 15.5 |
| | 1:00 | 34 |
| | 2:00 | 37 |
| | 9:00 | 60 |
| | 16:00 | 60 |
| | 41:00 | 60 |

TABLE II—Continued

| Example | Time, minutes-seconds | Temperature, degrees |
|---|---|---|
| VIII | 0:00 | 15 |
| | 1:00 | 30 |
| | 2:00 | 31 |
| | 3:00 | 50 |
| | 4:00 | 70 |
| | 7:00 | 80 |
| | 17:00 | 75 |
| | 22:00 | 71 |
| | 37:00 | 60 |
| IX | 0:00 | 24 |
| | 3:00 | 25 |
| | 4:00 | 26 |
| | 8:00 | 50 |
| | 11:00 | 80 |
| | 15:00 | 85 |
| | 25:00 | 91 |
| | 40:00 | 91 |
| | 55:00 | 23 |
| X | 0:00 | 18 |
| | 5:00 | 20 |
| | 6:00 | 41 |
| | 7:00 | 80 |
| | 9:00 | 84 |
| | 25:00 | 86 |
| | 37:00 | 84 |

TABLE II—Continued

| Example | Time, minutes-seconds | Temperature, degrees |
|---|---|---|
| XI | 0:00 | 19 |
| | 7:00 | 28.5 |
| | 10:00 | 62.5 |
| | 12:00 | 72 |
| | 15:00 | 75 |
| | 16:00 | 79 |
| | 17:00 | 84 |
| | 30:00 | 89 |
| XII | 0:00 | 17 |
| | 2:00 | 22.5 |
| | 3:00 | 23 |
| | 4:00 | 38 |
| | 5:00 | 55 |
| | 6:00 | 70 |
| | 8:00 | 80 |
| | 15:00 | 80 |
| | 30:00 | 61 |
| | 35:00 | 58 |
| XIII | 0:00 | 18 |
| | 2:00 | 23 |
| | 7:00 | 75 |
| | 37:00 | 73 |
| | 42:00 | 72 |
| XIV | 0:00 | 0 |
| | 5:00 | 90 |
| | 10:00 | 84 |
| | 17:00 | 90 |
| | 35:00 | 90 |
| XV | 0:00 | [1] 0 |
| | 5:00 | [1] −2.5 |
| | 10:00 | [1] −2 |
| | 100:00 | [1] 0 |
| | 107:00 | 70 |
| | 108:00 | 80 |
| | 115:00 | 88 |
| | 136:00 | 91 |
| XVI | 0:00 | [1] 0 |
| | 3:00 | [1] −2 |
| | 5:00 | [1] 0 |
| | 95:00 | [1] −2 |
| | 101:00 | 80 |
| | 105:00 | 85 |
| | 120:00 | 89 |
| | 126:00 | 89.5 |
| XVII | 0:00 | 23 |
| | 3:00 | 25 |
| | 7:00 | 70 |
| | 9:00 | 80 |
| | 29:00 | 90 |
| | 39:00 | |
| XVIII | 0:00 | 22.5 |
| | 2:00 | 25.5 |
| | 7:00 | 80 |
| | 12:00 | 86 |
| | 37:00 | 89 |
| XIX | 0:00 | 20 |
| | 4:00 | 21 |
| | 13:00 | 75 |
| | 15:00 | 80 |
| | 20:00 | 82 |
| | 24:00 | 83.5 |
| | 34:00 | 85 |
| | 37:00 | 85 |
| | 44:00 | 84 |
| XX | 0:00 | 25 |
| | 5:00 | 21 |
| | 10:00 | 21 |
| | 11:00 | 25 |
| | 20:00 | 73 |
| | 25:00 | 77 |
| | 55:00 | 77 |
| XXI | 0:00 | 27 |
| | 3:00 | 23 |
| | 5:00 | 24.5 |
| | 6:00 | 25 |
| | 7:00 | 34 |
| | 8:00 | 50 |
| | 10:00 | 75 |
| | 10:00 | 78 |
| | 11:00 | 80 |
| | 15:00 | 83 |
| | 20:00 | 83 |
| | 30:00 | 83 |
| | 41:00 | 80.5 |
| XXII | 0:00 | 20 |
| | 3:00 | 21 |
| | 13:00 | 43 |
| | 18:00 | 53 |
| | 27:00 | 67 |
| | 43:00 | 65 |
| | 48:00 | 60 |
| XXIII | 0:00 | 20 |
| | 1:00 | 25 |
| | 10:00 | 30 |
| | 25:00 | 50 |
| | 30:00 | 60 |
| | 45:00 | 67 |
| | 60:00 | 67 |
| XXIV | 0:00 | 18 |
| | 17:00 | 44 |
| | 20:00 | 57 |
| | 25:00 | 63 |
| | 40:00 | 77 |
| | 45:00 | 76 |
| | 60:00 | 65 |
| XXV | 0:00 | 12 |
| | 9:00 | 15 |
| | 37:00 | 35 |
| | 49:00 | 50 |
| | 65:00 | 70 |
| | 89:00 | 69 |
| XXVI | 0:00 | 16 |
| | 5:00 | 19 |
| | 15:00 | 42 |
| | 25:00 | 60 |
| | 35:00 | 68 |
| | 45:00 | 70 |
| | 50:00 | 57 |
| XXVII | 0:00 | 13 |
| | 5:00 | 15 |
| | 20:00 | 19 |
| | 30:00 | 52 |
| | 40:00 | 61 |
| | 72:00 | 67 |
| | 75:00 | 70 |
| XXVIII | 0:00 | 12 |
| | 25:00 | 14 |
| | 50:00 | 19 |
| | 85:00 | 22 |
| | 145:00 | 58 |
| | 165:00 | 73 |
| | 190:00 | 70 |
| | 205:00 | 40 |
| XXIX | 0:00 | 17 |
| | 7:00 | 30 |
| | 22:00 | 63 |
| | 27:00 | 66 |
| | 52:00 | 62 |
| XXX | 0:00 | 10 |
| | 2:00 | 15 |
| | 20:00 | 50 |
| | 35:00 | 70 |
| | 40:00 | 65 |
| XXXI | 0:00 | 15 |
| | 1:00 | 20 |
| | 5:00 | 25 |
| | 15:00 | 45 |
| | 18:00 | 50 |
| | 28:00 | 70 |
| | 30:00 | 72 |
| | 35:00 | 70 |
| | 50:00 | 60 |
| XXXII | 0:00 | 15 |
| | 5:00 | 20 |
| | 15:00 | 40 |
| | 18:00 | 50 |
| | 23:00 | 60 |
| | 30:00 | 70 |
| | 50:00 | 62 |

[1] In freezer.

Discussion of the reactants

The best yields are obtained when one equivalent of base and one equivalent of hypohalite are used for each mole of the amide. Satisfactory results, however, have been achieved when as much as two equivalents of the hypohalite were used per mole of the amide.

While the invention contemplates the use of alkali and alkaline earth metal hydroxides and alkali and alkaline earth metal hypohalites, sodium hydroxide and sodium hypohalite are preferred for economic reasons only. The other metal hydroxides and metal hypohalites are prefectly satisfactory but the cost thereof is much greater.

The metal hypohalite may be prepared by reacting chlorine or bromine with a water solution of an alkali metal or alkaline earth metal hydroxide, preferably sodium hydroxide. For example, a 1 N sodium hypochlorite solution can be prepared by reacting 79.98 g. NaOH with 70.9 g. chlorine (Cl₂) in sufficient water to make one liter. It can be appreciated that one equivalent of bromine (Br₂) can be substituted for chlorine to produce a sodium hypobromite solution; and in the same manner, 1 equivalent of an alkali or alkaline earth metal hydroxide can be substituted for the sodium hydroxide to produce a different metal hypohalite.

Water is the preferred solvent medium for the reaction due to low cost. Other solvents could be used alone or mixed with water such as alcohols or equivalents if they do not interfere with the course of the reaction. There is no advantage to this however. The exact amount of water to be used is not critical. The best results have been achieved with approximately 2 l. of water per mole of the starting amide. Satisfactory results have been achieved with as much as 20 l. and as little as 1 l. of water.

Discussion of the reaction method

In carrying out the process of the invention the metal hypohalite should first be admixed with the base, and then the amide should be added thereto. If the components are not admixed in this manner, there is a tendency for the amide to hydrolyze to the corresponding acid resulting in a lower yield.

The temperature at which the reaction is conducted can range from 0° to 100° with 60–80° being the most preferred. The reaction mixture should be held at the desired temperature for about ½ hour or until a negative test for hypohalite indicates the completion of the reaction.

At the end of the reaction, the reaction mixture is cooled to room temperature and neutralized with acid to a pH in the range of 10 to 4 to precipitate the product which can then be collected by filtration, washed and dried. The preferred pH range is from 5 to 6. Any acid can be used for the pH adjustment but mineral acids and simple organic acids such as acetic acid are most preferred for economic reasons.

The N-substituted 2,3- and 3,4-pyridinedicarboxamides, and 2,3-pyrazinedicarboxamides which constitute the starting materials for this invention can be made from corresponding pyridine, 2,3- and 3,4-dicarboxylic acids and pyrazine 2,3-dicarboxylic acid according to the method outlined below, through the imide, which is then reacted with a suitable amine. The preparation of N²-isopropyl-2,3-pyridinedicarboxamide is used as an example. The other N-monosubstituted 3,4-dicarboxamides of pyridine, and N-monosubstituted 2,3-dicarboxamides of pyrazine required to practice the invention can be produced in the same manner by reaction of the required imide with the appropriate amine.

A quantity of commercially available 2,3-pyridine-dicarboxylic acid, is reacted with a mixture of an excess of acetic anhydride and an excess of acetamide to produce the imide. It is desirable to use about twice as much acetic anhydride and about three times as much acetamide as is stoichiometrically required to react with the dicarboxylic acid starting compound.

In carrying out the process all of the reactants are charged, more or less simultaneously, into the reaction vessel and stirring is begun and continued throughout the reaction. Heat is then applied to bring the temperature of the reaction mixture to one in the range of 130°–140° and it is held at a temperature in that range for ½ hour. During this period, acetic acid (B.P. 118°), which is one of the reaction by-products, is continually boiled off at the temperature at which the reaction is conducted.

This reaction can be illustrated as follows:

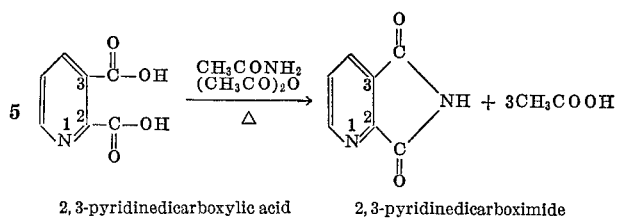

2,3-pyridinedicarboxylic acid     2,3-pyridinedicarboximide

The 2,3-pyridinedicarboximide made by the above described process is then reacted with isopropylamine in the presence of anhydrous ethanol at temperatures ranging from 0° to 50°. This reaction, which produces a mixture of two isomeric amides, can be illustrated as follows:

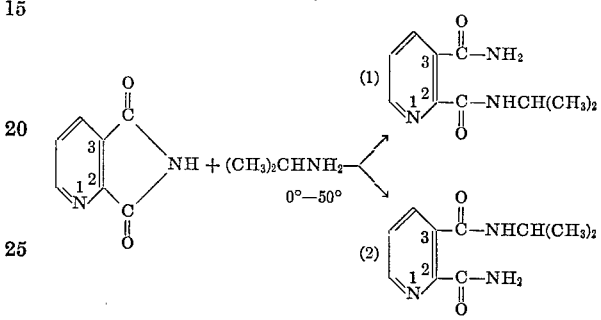

The two isomeric amides thus formed, (1) being N²-isopropyl-2,3-pyridinedicarboxamide, also known as 3-carbamoyl-N-isopropyl picolinamide, and (2) being N³-isopropyl-2,3-pyridinedicarboxamide, also known as 2-carbamoyl-N-isopropyl nicotinamide, are separated, either by preferential precipitation or by column chromatography. The N²-isopropyl-2,3-pyridinedicarboxamide is used according to the instant invention to make 3-isopropylpyrido[3,2-d]-pyrimidine-2,4(1H,3H)-dione.

The following specific example demonstrates the method for producing the starting materials of this invention as discussed above.

EXAMPLE A

A 2-liter, 3-necked flask equipped with a stirrer and a thermometer, and partially immersed in an oil bath was charged with 400 g. of 2,3-pyridinedicarboxylic acid, 400 g. acetamide, and 400 ml. acetic anhydride. Agitation was begun and continued throughout the reaction. The reaction mixture was then heated rapidly to a temperature of 136° and held at that temperature for 2 hours. During this period the acetic acid which was produced was distilled off. At the end of this time, the mixture was cooled, the solids removed by filtration, and the filtrate set aside. The solids were washed with cold methanol, dried, and weighed. The yield was 251.6 g. light tan material having a melting point of 239–240°. The filtrate, which had been set aside, was reduced in volume and a further yield of 9.2 g. of imide having a melting point of 239–240° obtained. The total yield was 260.8 g. 2,3-pyridinedicarboximide. The 2,3-pyridinecarboximide was used to prepare N²-isopropyl-2,3-pyridinedicarboxamide in the following manner.

A 500 ml. flask equipped with a stirrer, condenser, thermometer, bubbler, and addition funnel, and partially immersed in an ice bath, was charged with 29.6 g. 2,3-pyridinedicarboximide and 150 ml. 2-propanol. Agitation of the flask contents was begun and continued throughout the duration of the reaction. An addition of 11.8 g. isopropylamine was then commenced and charged over a 2-minute period. After the charging, the reaction mixture was stirred for an additional two hours and ten minutes, during which time the temperature of the reaction reached a high of 34°. At the end of this time, the thick slurry which had formed was cooled to about 3°, the solids were removed by filtration, and the filtrate was set aside. The solids were then washed with cold 2-propanol and dried.

The yield was 33.8 g. product which had a melting point of 139–140°, and was identified by Infrared Spectroscopy as $N^2$-isopropyl-2,3-pyridinedicarboxamide.

All of the 3-substituted compounds of the pyrido[3,2-d]pyrimidine-2,4(1H,3H)-dione and lumazine families made by the method of this invention have an unexpectedly high order or herbicidal activity. They have been found to be useful in controlling undesirable plants of both the monocotyledonous and the dicotyledonous species on either a postemergence or a preemergence basis.

By "preemergence" is meant that the compound is applied to the soil prior to emergence of the weed species sought to be controlled. This term, as used herein, also means the application of the herbicidal compounds falling within the scope of this disclosure to areas wherein useful or desirable plants are either growing or have been sown, but where the undesirable plants sought to be controlled have not as yet emerged.

By the term "postemergence" is meant that the compound is applied to the plant sought to be controlled after it has emerged from the soil surface. This term is also used to describe the application of herbicidally active compounds to soil surface in and around growing plants sought to be controlled for purposes of effecting root absorption by the undesirable plant species.

Especially active are the compounds where the 3-substituent is isopropyl, sec-butyl, cyclohexyl, or benzyl.

The preemergence and postemergence herbicidal activity of 3-isopropyl-pyrido[3,2-d]pyrimidine - 2,4(1H,3H) dione achieved at various application rates is shown in Table III below.

In carrying out the tests, seeds of the type of plants set forth in Table III were sown in fresh soil under greenhouse conditions. In the preemergence test the soil was sprayed with a solution of the test compound immediately after the seeds were planted, and before any noticeable growth developed in the test area. The solution was produced by dissolving 200 mg. of the compound in 10 cc. of acetone and/or alcohol. The compound was applied at the rate of 16 pounds per acre of soil surface.

Approximately three weeks after spray application, the herbicidal activity of the compound was determined by visual observation of the treated area in comparison with untreated control areas. These observations are reported below in Table III wherein the average activity rating is reported as the percent control of plant growth.

In the post-emergence test the soil and developing plants were sprayed approximately two weeks after the seeds were sown. The compound was applied at the rate of 8 pounds per acre from a solution of the test compound prepared by dissolving 100 mg. of the compound into 10 cc. acetone and/or alcohol in the manner previously described. The post-emergence herbicidal activity was measured in the same way as the pre-emergence activity; i.e. visual observation approximately eleven days after spraying, and expressed as the percent control of plant growth.

TABLE III

| | Percent control | |
| --- | --- | --- |
| | Preemergence treatment | Postemergence treatment |
| Alfalfa | 100 | 90 |
| Corn | 100 | 30 |
| Wild Oats | 100 | 70 |
| Cheatgrass | 100 | 50 |
| Foxtail | 100 | 100 |
| Barnyard Grass | 100 | 80 |
| Crabgrass | 100 | 100 |
| Nutgrass | 20 | 50 |
| Johnson Grass | 100 | 90 |
| Curled Dock | 100 | 100 |
| Snapbeans | 100 | 90 |
| Yellow Rocket | 100 | 100 |
| Chickweed | 100 | 70 |
| Cucumber | 100 | 100 |
| Pigweed | 100 | 100 |
| Velvet Leaf | 100 | 100 |
| Lambsquarter | 90 | 100 |

The same solutions of the same compound can also be sprayed, for example along railroad right-of-ways, at an application rate of about 10 to 16 pounds per acre as a total herbicide, i.e., to prevent all vegetation. The other compounds produced according to the method of the invention can be used as preemergence or postemergence herbicides in a similar manner. In the case of 3-cyclohexylpyrido[3,2-d]pyrimidine - 2,4-(1H,3H)-dione and 3 - sec - butylpyrido[3,2-d]pyrimiidne-2,4-(1H,3H)-dione, substantially the same application rates, e.g., as similar or salt solutions in water, are effective; this is also generally true of the other members of the pyrido[3,2-d]pyrimidine-2,4(1H,3H)-dione family, although slightly higher application rates may be required. 3-benzyl-pyrido[3,2-d]pyrimidine-2,4(1H,3H)-dione has been found to be peculiarly effective because of its selectivity; for example, applied as described above, at an application rate of 16 pounds per acre, the benzyl compound showed no preemergence herbicidal activity against cucumbers, corn or snapbeans, but total preemergence activity against alfalfa, cheat grass, crabgrass, curled dock, chickweed, pigweed and lambsquarter.

Information concerning the two families of compounds produced according to the method of the invention, applied as described, and discussed above as having an unexpectedly high order of herbicidal activity, is presented in Table IV.

Of the members of the pyrido[2,3-d] family investigated, only 3-ethyl-pyrido[2,3-d]pyrimidine-2,4(1H,3H) dione has been found to have herbicidal activity, and that only of a comparatively low order. For example, applied as described, at an application rate of 16 pounds per acre, the indicated compound was found to provide 100 percent control against snapbeans, 80 percent against chickweed, 80 percent against velvet leaf, 90 percent against nutgrass, and 80 percent again yellow rocket. In addition it had 100 percent control against volunteer soybeans. However, it had no significant control against cheat grass, wild oats, foxtail, barnyard grass, corn, alfalfa, johnson grass, curled dock, pigweed, cucumber, crabgrass or lambs quarters.

The following members of the [2,3-d], of the [4,3-d] and of the [3,4-d] families have been investigated at application rates of 16 pounds per acre, applied as described above, and have been found to have no appreciable herbicidal activity:

3-isopropyl-pyrido[2,3-d]pyrimidine-2,4(1H,3H)-dione
3-phenyl-pyrido[2,3-d]pyrimidine-2,4(1H,3H)-dione
3-cyclohexyl-pyrido[2,3-d]pyrimidine-2,4(1H,3H)-dione
3-isopropyl-pyrido[4,3-d]pyrimidine-2,4(1H,3H)-dione
3-isopropyl-pyrido[3,4-d]pyrimidine-2,4(1H,3H)-dione It will be appreciated from the foregoing discussion that the pyrido[3,2-d]pyrimidine-2,4(1H,3H)-dione and the lumazine families of compounds produced by the method of the invention have unexpected utility as herbicides, and that this unexpected utility prevails throughout the families of compounds produced by the claimed method. For example, the showing of a high order of herbicidal activity for $C_2$ through $C_8$ alkyl substituents in the 3-position (3-substituted-pyrido[3,2-d]pyrimidine-2,4(1H,3H)-dione family) and the demonstration that allyl, as a 3-substituent, has substantially the same order of activity as does an isopropyl substituent in the 3 position shows that alkenyl substituents in the same position impart activity of the same order as is impared by alkyl substituents and, therefore, demonstrates utility for 3 alkenyl substituents having no more than 8 carbon atoms. Similarly, the demonstration of a high order of activity where the 3-substituent, in the indicated family is a cycloalkyl group having 3 carbons, 6 carbons and 8 carbons demonstrates the high order of activity for such compounds where the 3-substituent is a cycloalkyl group having from 3 to 12 carbon atoms. Further, the demonstration of selectivity from 3 benzyl substituent, as well as the showing of a high order of activity therefor, demonstrates utility for aralkyl substituents in the indicated position.

TABLE IV

| | Compound applied (percent control) | | | | | | | | | | | |
|---|---|---|---|---|---|---|---|---|---|---|---|---|
| | Pyrido[3,2-d]pyrimidine-2,4(1H,3H)-dione | | 3-ethyl-pyrido[3,2-d]pyrimidine-2,4(1H,3H)-dione | | 3-propyl-pyrido[3,2-d]pyrimidine-2,4(1H,3H)-dione | | 3-butyl-pyrido[3,2-d]pyrimidine-2,4(1H,3H)-dione | | 3-sec.-butyl pyrido[3,2-d]pyrimidine-2,4(1H,3H)-dione | | 3-allyl-pyrido[3,2-d]pyrimidine-2,4(1H,3H)-dione | |
| | Pre* | Post** | Pre | Post | Pre | Post | Pre | Post | Pre | Post | Pre | Post |
| Alfalfa | 0 | 0 | 100 | 50 | 100 | 100 | 100 | 50 | 100 | 100 | 100 | 100 |
| Corn | 0 | 0 | 10 | 10 | 100 | 60 | 100 | 50 | 100 | 90 | 50 | 30 |
| Wild Oats | 0 | 0 | 100 | 0 | 100 | 90 | 100 | 100 | 100 | 100 | 100 | 20 |
| Cheatgrass | 0 | 0 | 100 | 30 | 100 | 100 | 100 | 100 | 100 | 100 | 100 | 30 |
| Foxtail | 0 | 0 | 40 | 40 | 100 | 100 | 100 | 100 | 100 | 100 | 90 | 100 |
| Barnyard Grass | 0 | 0 | 40 | 10 | 100 | 100 | 100 | 100 | 100 | 100 | 90 | 100 |
| Crabgrass | 0 | 0 | 100 | 80 | 100 | 100 | 90 | 100 | 100 | 100 | 100 | 100 |
| Nutgrass | 0 | 0 | 10 | 10 | 20 | 70 | 100 | 90 | 100 | 100 | 20 | 30 |
| Johnson Grass | 0 | 0 | 60 | 60 | 100 | 100 | 100 | 100 | 100 | 100 | 100 | 100 |
| Curled Dock | 0 | 0 | 100 | 90 | 100 | 100 | 90 | 100 | 100 | 100 | 90 | 100 |
| Snapbeans | 0 | 0 | 100 | 80 | 100 | 100 | 100 | 100 | 100 | 100 | 100 | 100 |
| Yellow Rocket | 0 | 0 | 100 | 100 | 100 | 100 | 100 | 90 | 100 | 100 | 100 | 100 |
| Chickweed | 0 | 0 | 100 | 100 | 100 | 100 | 100 | 100 | 100 | 100 | 100 | 100 |
| Cucumber | 0 | 0 | 100 | 50 | 100 | 100 | 100 | 100 | 100 | 100 | 100 | 100 |
| Pigweed | 0 | 0 | 100 | 90 | 100 | 100 | 100 | 90 | 100 | 100 | 100 | 100 |
| Velvet Leaf | 0 | 0 | 90 | 100 | 100 | 100 | 100 | 100 | 100 | 100 | 90 | 100 |
| Lambsquarter | 0 | 0 | 100 | 100 | 100 | 100 | 70 | 10 | 100 | 100 | 100 | 100 |

| | 3-(2-ethylhexyl)pyrido[3,2-d]pyrimidine-2,4(1H,3H)-dione | | 3-cyclopropyl pyrido[3,2-d]pyrimidine-2,4(1H,3H)-dione | | 3-cyclohexyl-pyrido[3,2-d]pyrimidine-2,4(1H,3H)-dione | | 3-cyclooctyl-pyrido[3,2-d]pyrimidine-2,4(1H,3H)-dione | | 3-benzyl pyrido[3,2-d]pyrimidine-2,4(1H,3H)-dione | |
|---|---|---|---|---|---|---|---|---|---|---|
| | Pre | Post | Pre | Post | Pre | Post | Pre | Post | Pre | Post |
| Alfalfa | 0 | 0 | 100 | 0 | 100 | 30 | 100 | 60 | 100 | 0 |
| Corn | 0 | 0 | 10 | 0 | 90 | 40 | 50 | 0 | 10 | 0 |
| Wild Oats | 0 | 0 | 180 | 160 | 100 | 100 | 100 | 40 | 30 | 0 |
| Cheatgrass | 0 | 0 | 100 | 0 | 100 | 80 | 100 | 30 | 100 | 0 |
| Foxtail | 0 | 0 | 10 | 0 | 100 | 100 | 100 | 80 | 90 | 0 |
| Barnyard Grass | 0 | 0 | 10 | 0 | 100 | 100 | 190 | 90 | 90 | 0 |
| Crabgrass | 10 | 10 | 100 | 10 | 100 | 100 | 100 | 100 | 100 | 40 |
| Nutgrass | 0 | 0 | 0 | 0 | 100 | 100 | 20 | 10 | 0 | 0 |
| Johnson Grass | 0 | 0 | 10 | 0 | 100 | 100 | 100 | 100 | 90 | 0 |
| Curled Dock | 0 | 10 | 100 | 10 | 100 | 100 | 100 | 100 | 100 | 0 |
| Snapbeans | 0 | 0 | 100 | 0 | 100 | 180 | 100 | 190 | 10 | 0 |
| Yellow Rocket | 90 | 90 | 100 | 100 | 100 | 100 | 100 | 100 | 90 | 70 |
| Chickweed | 70 | 50 | 100 | 100 | 100 | 100 | 100 | 100 | 100 | 100 |
| Cucumber | 10 | 20 | 100 | 20 | 100 | 100 | 90 | 100 | 0 | 10 |
| Pigweed | 0 | 100 | 100 | 90 | 100 | 100 | 100 | 100 | 100 | 100 |
| Velvet Leaf | 0 | 0 | 100 | 0 | 100 | 100 | 100 | 100 | 90 | 30 |
| Lambsquarter | 30 | 100 | 100 | 100 | 100 | 100 | 100 | 100 | 100 | 00 |

| | Lumazine, 3-isopropyl | | Lumazine, 3-butyl | | Lumazine, 3-sec.-butyl | | Lumazine, 3-cyclohexyl | | Lumazine, 3-cyclooctyl | |
|---|---|---|---|---|---|---|---|---|---|---|
| | Pre | Post | Pre | Post | Pre | Post | Pre | Post | Pre | Post |
| Alfalfa | 100 | 0 | 0 | 0 | 100 | 50 | 100 | 100 | 100 | 10 |
| Corn | 10 | 0 | 0 | 0 | 10 | 0 | 40 | 10 | 30 | 10 |
| Wild Oats | 10 | 0 | 0 | 0 | 30 | 0 | 20 | 10 | 100 | 10 |
| Cheatgrass | 10 | 0 | 0 | 0 | 90 | 0 | 10 | 50 | 100 | 0 |
| Foxtail | 10 | 0 | 0 | 0 | 30 | 0 | 20 | 10 | 40 | 50 |
| Barnyard Grass | 0 | 0 | 0 | 0 | 40 | 0 | 20 | 10 | 70 | 90 |
| Crabgrass | 70 | 0 | 0 | 0 | 100 | 0 | 80 | 20 | 90 | 100 |
| Nutgrass | 0 | 0 | 0 | 0 | 40 | 0 | 100 | 100 | 30 | 10 |
| Johnson Grass | 70 | 0 | 0 | 0 | 40 | 0 | 30 | 20 | 90 | 100 |
| Curled Dock | 100 | 0 | 0 | 0 | 70 | 50 | 90 | 100 | 100 | 100 |
| Snapbeans | 90 | 30 | 20 | 0 | 90 | 20 | 100 | 100 | 100 | 100 |
| Yellow Rocket | 100 | | 0 | 70 | 100 | 100 | 100 | 100 | 100 | 100 |
| Chickweed | 60 | 0 | 90 | 0 | 40 | 0 | 100 | 90 | 100 | 100 |
| Cucumber | 100 | 10 | 0 | 0 | 10 | 60 | 100 | 100 | 100 | 100 |
| Pigweed | 100 | 0 | 0 | 0 | 100 | 20 | 100 | 90 | 100 | |
| Velvet Leaf | 100 | 0 | 0 | 0 | 100 | 90 | 100 | 100 | 100 | 100 |
| Lambsquarter | 100 | 40 | 0 | 70 | 100 | 100 | 100 | 100 | 100 | 100 |

*Preemergence test: compound applied at rate of 16 lbs/acre.
**Postemergence test: compound applied at rate of 8 lbs/acre.

The compounds produced by the method of the invention which are not unexpectedly useful as herbicides are unexpectedly useful because of their close similarity, from a structural chemical standpoint, to compounds having extremely high orders of activity. This close structural similarity can be appreciated from a consideration of the following formulas:

(1)

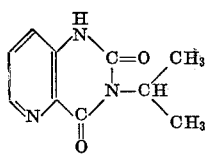

3 - isopropyl-pyrido[3,2-d]pyrimidine - 2,4(1H,3H)-dione (has a high order of activity)

(2)

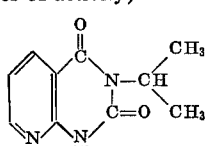

3 - isopropyl - pyrido[2,3-d]pyrimidine-2,4-(1H,3H)-dione (has no appreciable activity)

The pyrimidine diones produced by the method of the invention which are not particularly useful as herbicides are unexpectedly useful because of their close similarity, from a structural chemical standpoint, to compounds having extremely high orders of activity. For example, 3-n-butyl pyrazino[2,3-d]pyrimidine-2,4(1H,3H)-dione has a considerably lower order of herbicidal activity than does 3-n-butyl pyrido[3,2-d]pyrimidine-2,4(1H,3H)-dione, and members of other families of pyrimidine diones produced by the method of the invention are substantially inert as herbicides. The close structural similarities among these several compounds, coupled with the fact reported herein of the significant difference in order of herbicidal activity provides the basis for an orderly investigation, on the basis of molecular models, of the relationship between chemical structure and herbicidal activity, the development of a theory explaining this relationship, and consequent significant advance in the useful arts on the basis of intelligent application of the theoretical explanation by skilled workers in the art.

The pyrimidine diones produced by the method of the invention are also useful as ingredients of suntan lotions, because they absorb ultraviolet radiation in the burning spectrum, being substantial equivalents for the commercially used salicylates for which they can be substituted in commercial lotions. In addition, they are corrosion inhibitors, useful in pickling baths and the like. The corrosion inhibiting characteristics of the pyrimidine diones produced by the method of the invention have been demonstrated by immersing carefully cleaned, dried and weighed 1010 steel coupons in 5 percent sulfuric acid to which a minor amount of the pyrimidine dione has been added for a period of 4 hours at 75° and then again carefully cleaning, washing, drying and weighing the coupons. The percentage weight loss, which is 100 times the weight loss in grams divided by the weight of the coupon, inhibited versus uninhibited 5 percent sulfuric acid, indicates that the pyrimidine diones produced by the method of the invention are useful as corrosion inhibitors.

The acid anhydrides produced by the method of the invention, as has been indicated above, can be converted to pyrimidine diones by reaction with an appropriate amine and ring-closure with phosgene. The corresponding sulfur analogues can also be produced by ring-closure with thiophosgene

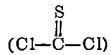

these analogues are preferred as corrosion inhibitors because equilibrium favors the CSH form rather than the favored C=O form of the diones.

What I claim is:
1. The process which comprises
   (A) reacting
      (1) a compound selected from those having the general formulas

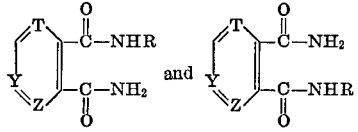

and mixtures thereof wherein each of T, Y and Z is nitrogen or CH and at least one is nitrogen and at least one is CH, and wherein when Y is nitrogen, T and Z are CH, and wherein R is a member of the group consisting of alkyl groups having from 1 to 8 carbon atoms, benzyl, phenethyl, chlorobenzyl, dichlorobenzyl, methoxybenzyl, cycloalkyl groups having from 3 to 8 carbon atoms, allyl, propargyl, dimethoxyethyl, pyridylethyl, pyridylmethyl and tetrahydrofurfuryl, with
      (2) a metal hypohalite of the formula MOX wherein M is an alkali metal and wherein X is chlorine or bromine, and
      (3) a water solution of an alkali metal hydroxide, wherein the reaction mixture comprises 1 equivalent of said metal base and from 1 to 2 equivalents of metal hypohalite per mole of the heterocyclic compound,
   (B) heating the reaction mixture to a temperature in the range of 0° to 100° until reaction is complete, and
   (C) thereafter adjusting to a pH in the range of 10 to 4, and
   (D) recovering the product.

2. The process of claim 1 wherein the metal base is sodium hydroxide and the metal hypohalite is sodium hypochlorite.

3. The process of claim 1 wherein the reaction temperature is from about 60° to about 80°.

4. The process of claim 1 wherein R is selected from the group consisting of isopropyl, sec-butyl, cyclohexyl, and benzyl.

5. The process of claim 4 wherein R is isopropyl.

6. The process of claim 4 wherein R is sec-butyl.

7. The process of claim 4 wherein Z is nitrogen, and T is carbon.

8. The process of claim 4 wherein Y is nitrogen.

9. The process of claim 4 wherein Z and T are nitrogen.

References Cited

McLean et al., J. Chem. Soc., 2582–85 (1949).

ALEX MAZEL, Primary Examiner

R. V. RUSH, Assistant Examiner

U.S. Cl. X.R.

71—74, 92; 252—392; 260—250 R, 295.5 A; 424—59